(12) United States Patent
Frenne et al.

(10) Patent No.: US 9,236,991 B2
(45) Date of Patent: Jan. 12, 2016

(54) NETWORK NODE, USER EQUIPMENT AND METHODS THEREIN

(75) Inventors: Mattias Frenne, Uppsala (SE); Christian Hoymann, Aachen (DE); George Jongren, Stockholm (SE); Johan Furuskog, Bromma (SE); Daniel Larsson, Solna (SE); Jung-Fu Cheng, Fremont, CA (US); Havish Koorapaty, Saratoga, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 468 days.

(21) Appl. No.: 13/502,700

(22) PCT Filed: Feb. 7, 2012

(86) PCT No.: PCT/SE2012/050114
§ 371 (c)(1),
(2), (4) Date: Apr. 18, 2012

(87) PCT Pub. No.: WO2013/066232
PCT Pub. Date: May 10, 2013

(65) Prior Publication Data
US 2013/0114522 A1 May 9, 2013

Related U.S. Application Data

(60) Provisional application No. 61/555,567, filed on Nov. 4, 2011.

(51) Int. Cl.
*H04W 4/00* (2009.01)
*H04L 5/00* (2006.01)

(52) U.S. Cl.
CPC ............ *H04L 5/0051* (2013.01); *H04L 5/0094* (2013.01); *H04L 5/0007* (2013.01)

(58) Field of Classification Search
CPC .. H04W 72/04; H04W 72/042; H04W 72/044
USPC .................................................. 370/310-350
See application file for complete search history.

(56) References Cited

U.S. PATENT DOCUMENTS

2013/0039284 A1* 2/2013 Marinier et al. ............... 370/329
2014/0347972 A1* 11/2014 Lee et al. ....................... 370/209

OTHER PUBLICATIONS

Alcatel-Lucent et al., "PDCCH Enhancement in Rel-11", 3GPP TSG RAN WG1, Athens, Greece, Aug. 22-26, 2011, 6 Pages.
(Continued)

*Primary Examiner* — Andrew Chriss
*Assistant Examiner* — Kenan Cehic
(74) *Attorney, Agent, or Firm* — Myers Bigel Sibley & Sajovec, PA

(57) ABSTRACT

A method in a user equipment device for estimating a channel upon receiving an enhanced control channel (eCCH) from a network node in a telecommunications system includes distributing the eCCH over multiple resource pairs, where each of the multiple resource block pairs includes a number of resources. Each of the resources is associated with a respective antenna port. The user equipment device identifies an antenna port that is associated with multiple ones of the resources. The multiple ones of the resources are present in different resource block pairs of the multiple resource block pairs over which the eCCH is distributed. Identifying the antenna port is based on how the eCCH is mapped to the multiple resource block pairs. The user equipment device estimates the downlink channel for the eCCH based on the identified antenna port in the multiple ones of the resources in the multiple resource block pairs.

18 Claims, 12 Drawing Sheets

(56) References Cited

OTHER PUBLICATIONS

Ericsson et al., "On enhanced PDCCH design", 3GPP TSG-RAN WG1, Zhuhai, China, Oct. 10-14, 2011; 3 Pages.
International Search Report Corresponding to International Application No. PCT/SE2012/050114; Date of Mailing: May 16, 2012; 13 Pages.
Research in Motion et al., "E-PDCCH Transmission with Transmit Diversity", 3GPP TSG RAN WG1, Zhuhai, China, Oct. 10-14, 2011; 4 Pages.
Zte, "Aspects on DL control signaling enhancements", TSG-RAN WG1, Barcelona, Spain, May 9-13, 2011; 4 Pages.

* cited by examiner

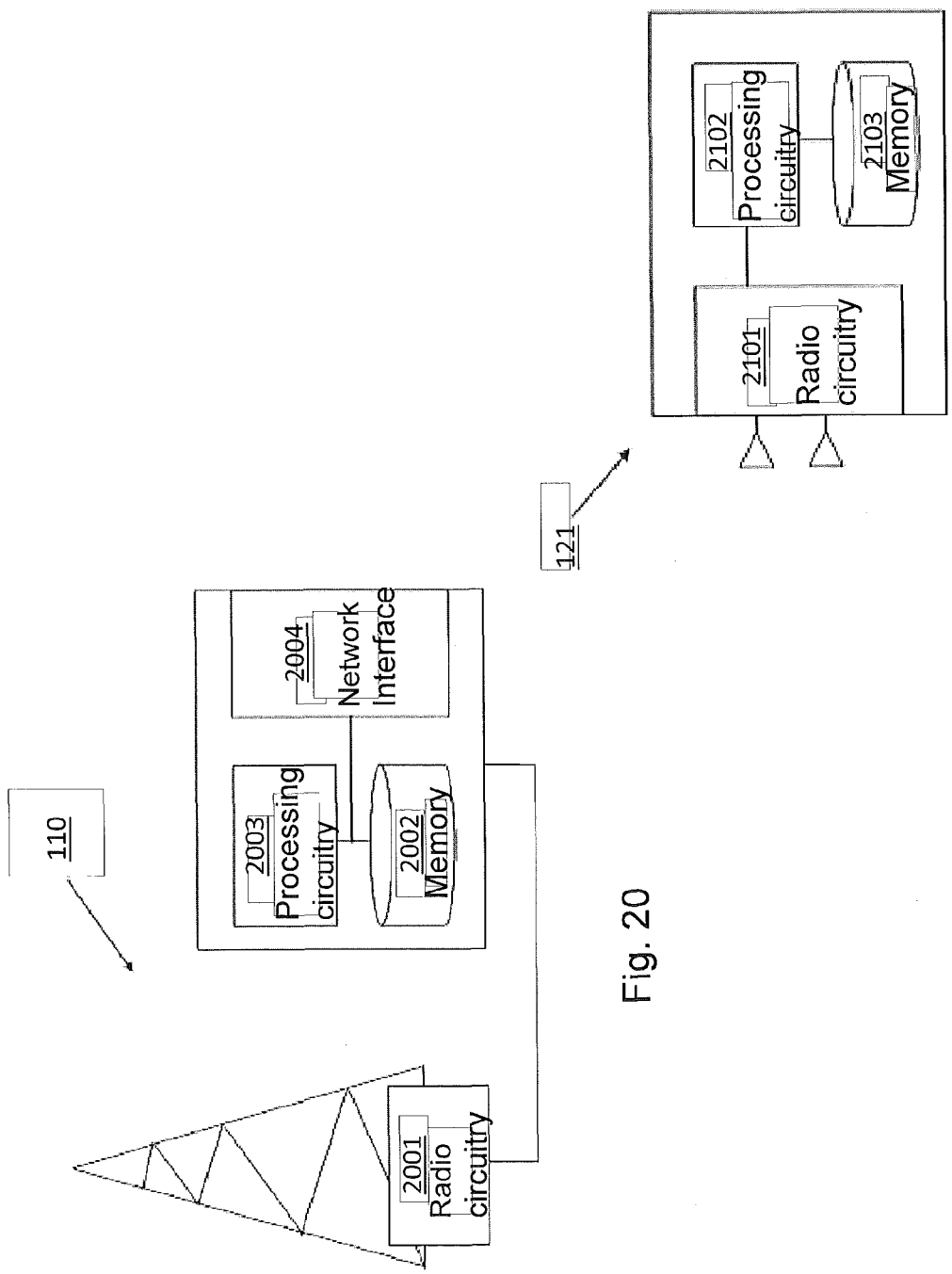

NETWORK NODE, USER EQUIPMENT AND METHODS THEREIN

CROSS-REFERENCE TO RELATED APPLICATION

This application is a 35 U.S.C. §371 national stage application of PCT International Application No. PCT/SE2012/050114, filed on Feb. 7, 2012, which claims priority to U.S. Provisional Application No. 61/555,567, filed on Nov. 4, 2011, the entire contents of which are incorporated by reference herein as if set forth in their entirety.

FIELD

Embodiments herein relate to a network node, a user equipment and methods therein. In particular, embodiments herein relate to transmitting and handling enhanced Control CHannels (eCCH) in a telecommunications system.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE technology is a mobile broadband wireless communication technology in which transmissions are sent using orthogonal frequency division multiplexing (OFDM), wherein the transmissions are sent from base stations, also referred to herein as network nodes or eNBs, to mobile stations, also referred to herein as user equipments or UEs. The transmission OFDM splits the signal into multiple parallel sub-carriers in frequency.

The basic unit of transmission in LTE is a resource block (RB) which in its most common configuration comprises of 12 subcarriers and 7 OFDM symbols in one time slot. A unit of one subcarrier and 1 OFDM symbol is referred to as a resource element (RE), as shown in FIG. 1. Thus, an RB comprises 84 REs.

Accordingly, a basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies for subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized sub-frames, #0-#9, each with a $T_{sub-frame}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

An LTE radio sub-frame is composed of multiple RBs in frequency with the number of RBs determining the bandwidth of the system and two slots in time, as shown in FIG. 3. Furthermore, the two RBs in a sub-frame that are adjacent in time are denoted as an RB pair.

The signal transmitted by the network node in a downlink, that is, the link carrying transmissions from the network node to the user equipment, sub-frame may be transmitted from multiple antennas and the signal may be received at a user equipment that has multiple antennas. The radio channel distorts the transmitted signals from the multiple antenna ports. In order to demodulate any transmissions on the downlink, a user equipment relies on reference signals (RS) that are transmitted on the downlink. These reference signals (RS) and their position in the time-frequency grid are known to the user equipment and hence may be used to determine channel estimates by measuring the effect of the radio channel on these signals.

It should be noted in this context that the channel an user equipment measures is not necessarily from a particular physical transmit antenna element at the network node to the user equipments receiver antenna element, since the user equipment base the measurement on a transmitted RS and the channel it measures depends on how the particular RS is transmitted from the multiple physical antenna elements at the network node. Therefore, the concept of an antenna port is introduced, where an antenna port is a virtual antenna that is associated with an RS.

Hence, a user equipment measures the channel from an antenna port to the receiver antenna element using the RS associated with that antenna port but which or which group of physical transmit antenna elements that are actually used for the transmission of this RS is transparent and also irrelevant for the user equipment; the transmission on an antenna port may use a single physical antenna element or a combination of signals from multiple antenna elements. Hence, in the effective channel that the user equipment measures from the antenna port, the used precoding or mapping to physical antenna elements is transparently included.

An example of utilization of multiple antenna elements is the use of transmit precoding to direct the transmitted energy towards one particular receiving user equipment, by using all available antenna elements for transmission to transmit the same message, but where individual phase and possibly amplitude weights are applied at each transmit antenna element. This is sometimes denoted UE-specific precoding and the RS in this case is denoted UE-specific RS. If the transmitted data in the RB is pre-coded with the same UE-specific precoding as the data, then the transmission is performed using a single virtual antenna, i.e. a single antenna port, and the user equipment need only to perform channel estimation using this single UE-specific RS and use it as a reference for demodulating the data in this RB.

The UE-specific RS are transmitted only when data is transmitted to a user equipment in the sub-frame otherwise they are not present. In LTE, UE-specific RS are included as part of the RBs that are allocated to a user equipment for reception of user data.

FIG. 4 shows examples of UE-specific reference signals in LTE, where for example all RE denoted $R_7$ belong to one "RS", hence what is known as an RS is a collection of distributed REs comprising reference symbols.

Another type of reference signals are those that may be used by all user equipments and thus have wide cell area coverage. One example of these is the common reference signals (CRS) that are used by user equipments for various purposes including channel estimation and mobility measurements. These CRS are defined so that they occupy certain pre-defined REs within all the sub-frames in the system bandwidth irrespectively of whether there is any data being sent to users in a sub-frame or not. In FIG. 3, these CRS are shown as "reference signals" or "reference signals comprising a set of reference symbols".

Messages transmitted over the radio link to users may be broadly classified as control messages or data messages. Control messages are used to facilitate the proper operation of the system as well as proper operation of each user equipment within the system. Control messages could include commands to control functions such as the transmitted power from a user equipment, signalling of RBs within which the data is to be received by the user equipment or transmitted from the user equipment and so on. Examples of control messages are the physical downlink control channel (PDCCH) which for example carry scheduling information and power control messages, the physical HARQ indicator channel (PHICH), which carries ACK/NACK in response to a previous uplink transmission and the physical broadcast channel (PBCH) which carries system information.

In LTE Release 10, control messages are demodulated using the CRS, except for the R-PDCCH as is seen below, hence they have a wide cell coverage to reach all user equipments in the cell without having knowledge about their position. The first one to four OFDM symbols, depending on the configuration, in a sub-frame are reserved for control information, as shown in FIG. 3. Control messages could be categorized into those types of messages that need to be sent only to one user equipment, that is, UE-specific control, and those that need to be sent to all user equipments or some subset of user equipments numbering more than one, that is, common control, within the cell being covered by the network node.

It shall be noted in this context that in future LTE releases, there will be new carrier types which may not have a PDCCH transmission or transmission of CRS.

PDCCH Processing

Control messages of PDCCH type are transmitted in multiples of units called Control Channel Elements (CCEs) where each CCE maps to 36 REs. A PDCCH may have aggregation level (AL) of 1, 2, 4 or 8 CCEs to allow for link adaptation of the control message. Furthermore, each CCE is mapped to 9 resource element groups (REG) comprising 4 RE each. These REG are distributed over the whole bandwidth to provide frequency diversity for a CCE. Hence, the PDCCH, which comprises up to 8 CCEs spans the entire system bandwidth in the first n={1, 2, 3 or 4} OFDM symbols, depending on the configuration.

In FIG. 5, one CCE belonging to a PDCCH is mapped to the control region which spans the whole system bandwidth.

Introducing an Enhanced Control Channel (eCCH)

Transmission of the physical downlink shared data channel (PDSCH) to user equipments may use REs in RB pairs that are not used for control messages or RS and may either be transmitted using the UE-specific reference symbols or the CRS as a demodulation reference, depending on the transmission mode. The use of UE-specific RS allows a multi-antenna network node to optimize the transmission using precoding of both data and reference signals being transmitted from the multiple antennas so that the received signal energy increase at the user equipment. Consequently, the channel estimation performance is improved and the data rate of the transmission could be increased.

In LTE Release 10, a relay control channel was also defined, denoted R-PDCCH for transmitting control information from network node to relay nodes. The R-PDCCH is placed in the data region, hence, similar to a PDSCH transmission. The transmission of the R-PDCCH may either be configured to use CRS to provide wide cell coverage or relay node (RN) specific reference signals to improve the link performance towards a particular RN by precoding, similar to the PDSCH with UE-specific RS. The UE-specific RS is in the latter case used also for the R-PDCCH transmission. The R-PDCCH occupies a number of configured RB pairs in the system bandwidth and is thus frequency multiplexed with the PDSCH transmissions in the remaining RB pairs, as shown in FIG. 6.

FIG. 6 shows a downlink sub-frame showing 10 RB pairs and transmission of 3 R-PDCCH, that is, red, green or blue, of size 1 RB pair each. The R-PDCCH does not start at OFDM symbol zero to allow for a PDCCH to be transmitted in the first one to four symbols. The remaining RB pairs may be used for PDSCH transmissions.

In LTE Release 11 discussions, attention has turned to adopt the same principle of UE-specific transmission as for the PDSCH and the R-PDCCH for enhanced control channels (eCCH), that is, comprising PDCCH, PHICH, PCFICH, PBCH, by allowing the transmission of generic control messages to a user equipment using such transmissions be based on UE-specific reference signals. This means that precoding gains may be achieved also for the control channels. Another benefit is that different RB pairs may be allocated to different cells or different transmission points within a cell, and thereby may inter-cell interference coordination between control channels be achieved. This frequency coordination is not possible with the PDCCH since the PDCCH spans the whole bandwidth.

FIG. 7 shows an ePDCCH which, similar to the CCE in the PDCCH, is divided into multiple groups and mapped to one of the enhanced control regions. That is, a downlink sub-frame showing a CCE belonging to an ePDCCH that is mapped to one of the enhanced control regions, to achieve localized transmission.

Note that, in FIG. 10, the enhanced control region does not start at OFDM symbol zero, to accommodate simultaneous transmission of a PDCCH in the sub-frame. However, as was mentioned above, there may be carrier types in future LTE releases that do not have a PDCCH, in which case the enhanced control region could start from OFDM symbol zero within the sub-frame.

Even if the eCCH enables UE-specific precoding and such localized transmission, as shown in FIG. 10, it may in some cases be useful to be able to transmit an eCCH in a broadcasted, wide area coverage fashion. This is useful if the network node does not have reliable information to perform precoding towards a certain user equipment, then a wide area coverage transmission is more robust, although the precoding gain is lost. Another case is when the particular control message is intended to more than one user equipment, in this case, UE-specific precoding cannot be used. An example is the transmission of the common control information using PDCCH, that is, in the common search space. In yet another case, sub-band precoding may be utilized, since the user equipment estimates the channel in each RB pair individually, the network node may choose different precoding vectors in the different RB pairs, if the network node has such information that the preferred precoding vectors is different in different parts of the frequency band.

In any of these cases a distributed transmission may be used, as shown in FIG. 8, where the eREG belonging to the same ePDCCH are distributed over the enhanced control regions.

FIG. 8 shows a downlink sub-frame showing a CCE belonging to an ePDCCH is mapped to multiple of the enhanced control regions, to achieve distributed transmission and frequency diversity or sub-band precoding.

FIG. 9 shows a downlink RB pair showing an example with 4 enhanced resource element groups (eREG) each comprising 36 RE, i.e. (42-6 RE), and 2 antenna ports (AP0, AP1). Each eREG is associated with an antenna port and each AP is associated with 2 eREG. Note that according to other examples an eREG may comprise 72 REs.

Thus, one concept for enhanced control signal transmission with UE-specific reference signals is wherein for each configured RB or RB pair used for control channel transmission, multiple orthogonal resources are defined. A resource is most generally defined as a region in the time-frequency OFDM grid comprising a subset of the RE in the RB or in the RB pair plus a cover code from a set of orthogonal cover codes. Hence, the resources are orthogonally multiplexed in time, frequency and code domain, that is, TDM, FDM and CDM, respectively. Below, without loss of generality, it is assumed that the code division is not used, instead a resource is defined as a region in the time frequency grid only.

Each of the time frequency resources is associated with a unique RS, or equivalently antenna port, which is located in the same RB or RB pair. When a user equipment demodulates the information in a given resource of the RB or RB pair, it uses the RS/antenna port associated with that resource. Furthermore, each resource in an RB or RB pair may be independently assigned to user equipments. FIG. 9 shows an example, where time and frequency division of RE into resources denoted enhanced RE groups, that is, the eREG is one resource, is used and where each eREG is associated with one RS from the set of orthogonal RS in the RB or RB pair.

Each eREG is associated with an Antenna Port (AP) and this may, for example, be described with a node diagram as shown in FIG. 10. Here, it may be seen that eREG 1 and eREG 3 are associated with antenna port (AP) 0. When a user equipment demodulates part of an ePDCCH transmitted in for example eREG1, it will use the RS associated with AP0 for demodulation.

FIG. 10 shows the association between AP and eREG in the example shown in FIG. 9. Note that even if multiple orthogonal RS are used in the RB or RB pair, there is only one layer of control data transmitted. As is shown in FIG. 10, it is possible that more than one eREG is using one AP, which is possible since the eREG are orthogonal in the time-frequency OFDM grid. Note that in this case will both eREG1 and eREG3 use the same precoding vector since they use the same antenna port.

The use of antenna ports here shall not be confused with MIMO multiple layer transmission in an RB pair, where each of the multiple RS or AP corresponds to a transmitted MIMO layer. If this would be the case, one eREG would have multiple layers and each eREG would then need to be associated with more than one AP, one per layer. FIG. 11 shows the related node diagram for this case. FIG. 11 shows the association between AP and eREG in the case of spatial multiplexing where eREG 1 contains two layers, each associated with an AP.

In each resource, control information is transmitted comprising, but not limited to, an enhanced PDCCH, a CCE or a fraction of a CCE, an enhanced PHICH or an enhanced PBCH. If the resource is too small to fit a whole enhanced PDCCH, CCE, PHICH or PBCH, a fraction may be transmitted in the resource and the other fraction in other resources in other RB or RB pairs elsewhere in the same sub-frame as was shown in FIG. 11. Note that resources in other RB or RB pairs are associated with their respective antenna ports within the same RB or RB pair.

A typical channel estimator operating on UE-specific RS also use the transmitted common reference signals (CRS) for the tuning of its channel estimation filters, such as, for example, estimating Doppler and coherence bandwidth. The eCCH is intended to be used also on new carrier types, which may not have any CRS transmissions at all.

This means that such channel estimation tuning is not possible or must be performed based on other, eventually more sparse, reference signals. This results in degraded channel estimation performances.

SUMMARY

It is an object of embodiments herein to provide a way of improving channel estimation performance in a telecommunications system.

According to a first aspect of embodiments herein, the object is achieved by a method in a user equipment for estimating a downlink channel upon receiving an enhanced control channel, eCCH, from a network node in a telecommunications system. The eCCH is distributed over multiple resource block pairs, wherein each of the multiple resource block pairs comprises a number of resources. Each resource is associated with a respective antenna port. The user equipment identifies an antenna port being associated with more than one resource. The more than one resource is present in different resource block pairs of the multiple resource block pairs over which the eCCH is distributed. The identifying is based on how the eCCH is mapped to the multiple resource block pairs. Also, the user equipment estimates the downlink channel for the eCCH based on the identified antenna port in the more than one resource in the multiple resource block pairs.

According to a second aspect of embodiments herein, the object is achieved by a user equipment for estimating a downlink channel upon receiving an enhanced control channel, eCCH, from a network node in a telecommunications system. The eCCH is distributed over multiple resource block pairs, wherein each of the multiple resource block pairs comprises a number of resources. Each resource is associated with a respective antenna port. The user equipment comprises a processing circuitry configured to identify an antenna port being associated with more than one resource. The more than one resource are present in different resource block pairs of the multiple resource block pairs over which the eCCH is distributed. The identifying is based on how the eCCH is mapped to the multiple resource block pairs. Also, the processing circuitry is configured to estimate the downlink channel for the eCCH based on the identified antenna port in the more than one resource in the multiple resource block pairs.

According to a third aspect of embodiments herein, the object is achieved by a method in a network node for transmitting an enhanced control channel, eCCH, to a user equipment in a telecommunications system. The eCCH is distributed over multiple resource block pairs, wherein each of the multiple resource block pairs comprises a number of resources. Each resource is associated with a respective antenna port. The network node maps the eCCH to the multiple resource block pairs, such that more than one resource present in different resource block pairs of the multiple resource block pairs over which the eCCH is distributed, is associated with the same antenna port. Also, the user equipment transmits the mapped eCCH to the user equipment.

According to a fourth aspect of embodiments herein, the object is achieved by a network node for transmitting an enhanced control channel, eCCH, to a user equipment in a telecommunications system. The eCCH is distributed over multiple resource block pairs, wherein each of the multiple resource block pairs comprises a number of resources. Each resource is associated with a respective antenna port. The network node comprises a processing circuitry configured to map the eCCH to the multiple resource block pairs, such that more than one resource present in different resource block pairs of the multiple resource block pairs over which the eCCH is distributed, is associated with the same antenna port. Also, the processing circuitry is configured to transmit the mapped enhanced control channel to the user equipment via a radio circuitry.

By being configured to identify certain mapping conditions, that is, predetermined ways in which a received eCCH has been mapped to and is distributed to the resources in the multiple resource block pairs in the OFDM grid, the user equipment is able to make assumptions which it may use during the demodulation of the received eCCH. These assumptions may comprise that a used antenna port in a first used resource block pair is the same as a used antenna port in a second used resource block pair.

Thus, during demodulation of the received eCCH, the user equipment may estimate the downlink channel for the eCCH in the first and second used resource block pair based on the identified antenna port in both of the first and second resource block pairs, that is, determine a joint downlink channel estimate for the eCCH by measuring the effect of the radio channel on the antenna port in both the first and second used resource block. This increases the amount of information that the user equipment may use to estimate the downlink channel, and thus advantageously improves the channel estimation performance.

It is also an important advantage a robust channel estimation for new carrier types in which common reference signals (CRS) are not present is provided.

BRIEF DESCRIPTION OF THE DRAWINGS

The above and other features and advantages of the present embodiments will become readily apparent to those skilled in the art by the following detailed description of exemplary embodiments thereof with reference to the accompanying drawings, wherein:

FIG. 20 is a schematic block diagram of embodiments of a network node, FIG. 21 is a schematic block diagram of embodiments of a user equipment.

DETAILED DESCRIPTION

Figure 1:
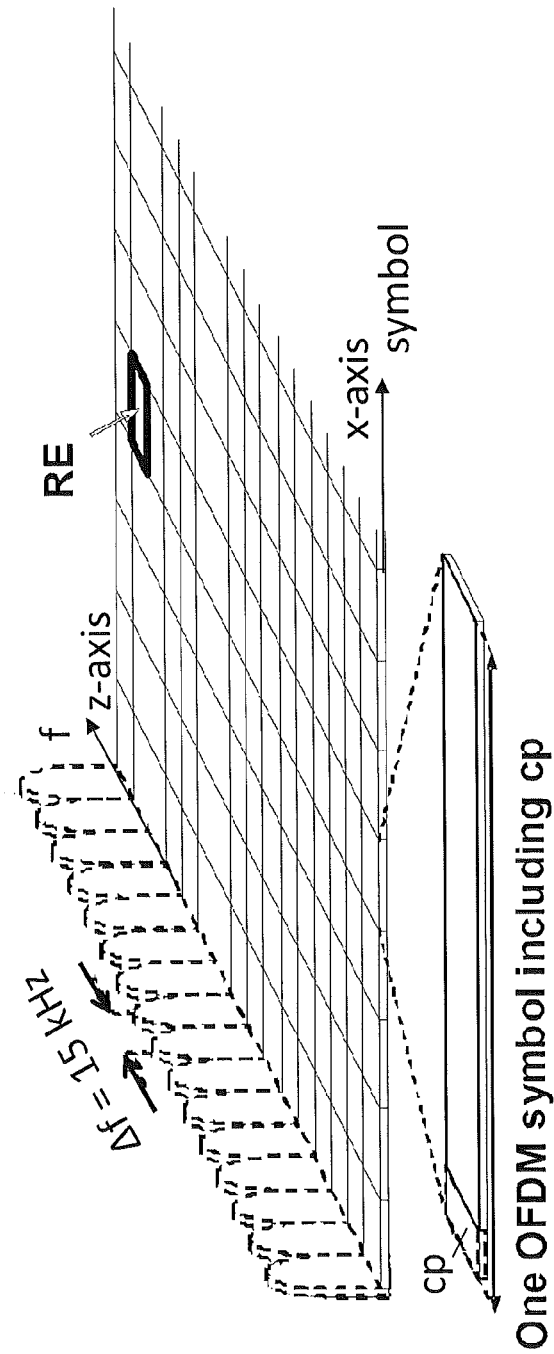
FIG. 1 is a schematic block diagram of a LTE downlink physical resource.
Figure 2:
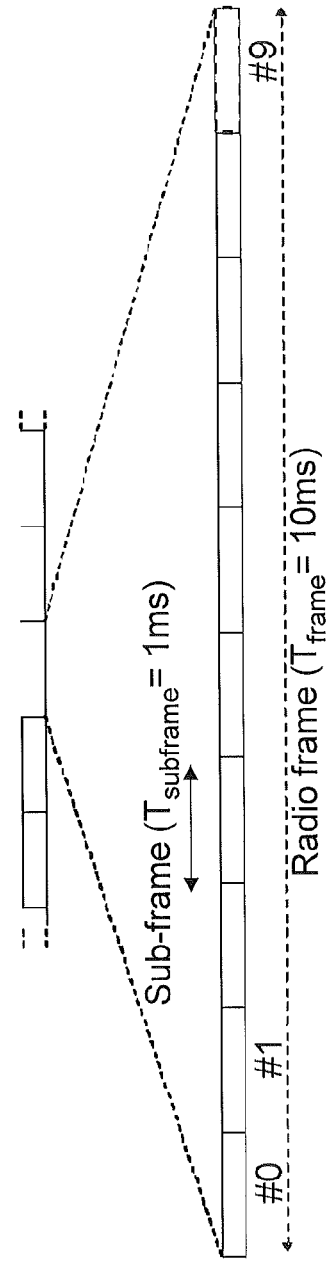
FIG. 2 is a schematic overview depicting radio frames.
Figure 3:
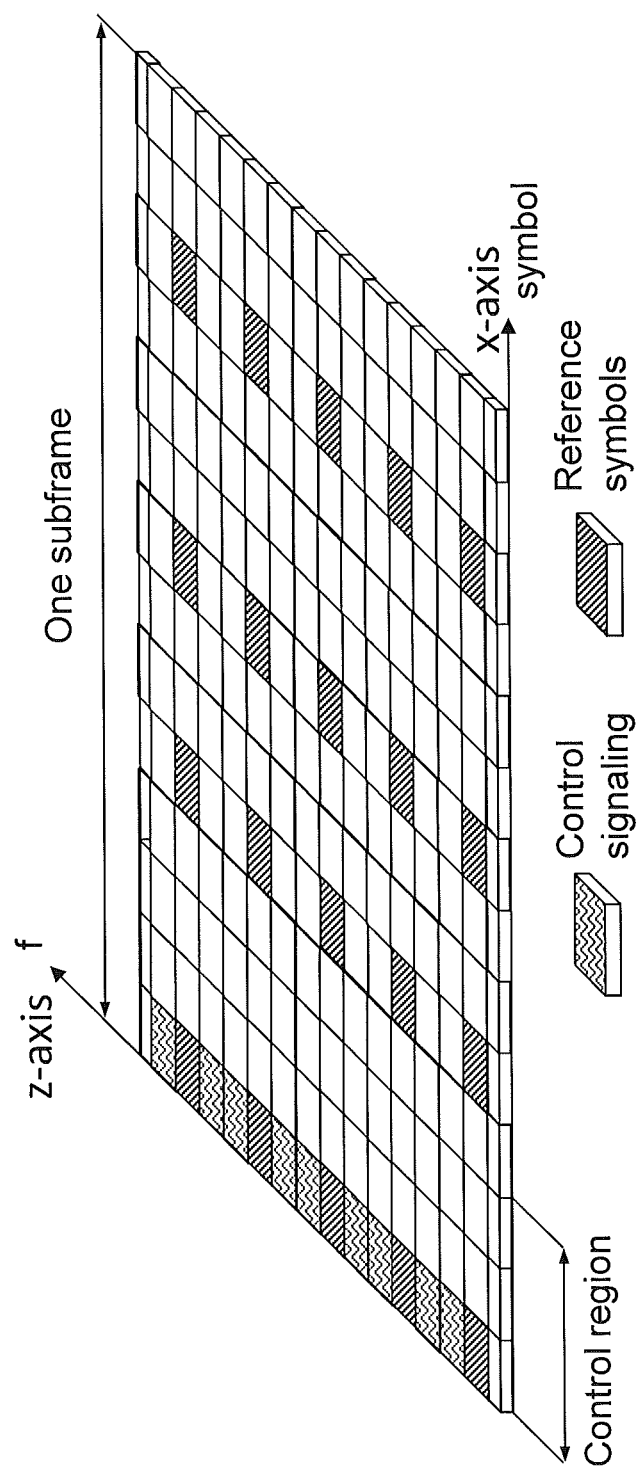
FIG. 3 is a schematic overview depicting a DL sub-frame.

The figures are schematic and simplified for clarity, and they merely show details which are essential to the understanding of the embodiments, while other details have been left out. Throughout, the same reference numerals are used for identical or corresponding parts or steps.

Figure 12:
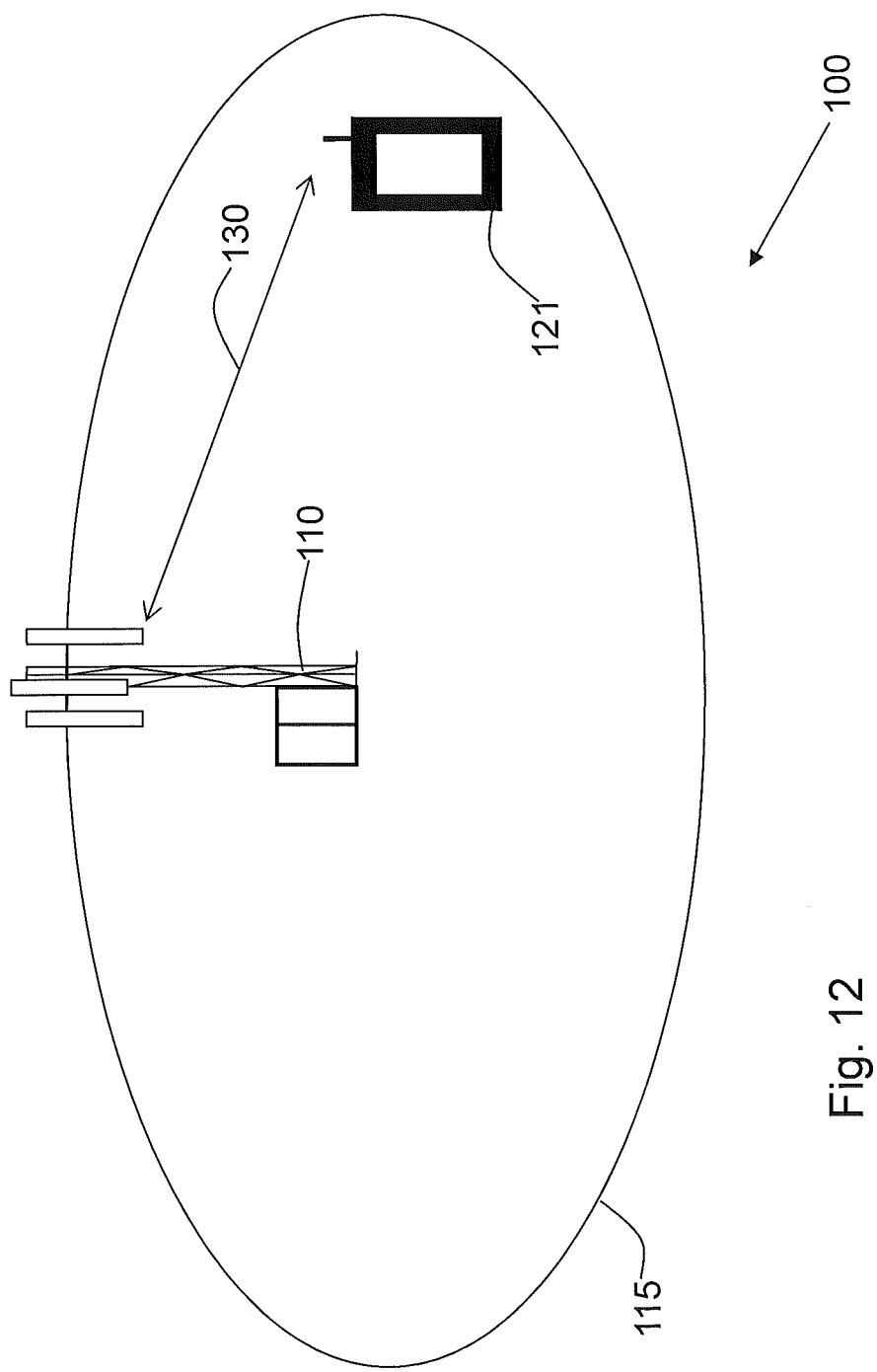
FIG. 12 is a schematic block diagram illustrating embodiments in a telecommunications system.

FIG. 12 depicts a telecommunications system 100 in which embodiments herein may be implemented. The cellular communications system 100 is a wireless communication network such as an LTE, WCDMA, GSM network, any 3GPP cellular network, or any cellular network or system.

The telecommunications system 100 comprises a base station, which is a network node and is therefore referred to herein as the network node 110. The network node 110 serves a cell 115. The network node 110 may in this example e.g. be an eNB, eNodeB, or a Home Node B, a Home eNode B, femto Base Station (BS), pico BS or any other network unit capable to serve a user equipment or a machine type communication device which are located in the cell 115 in the telecommunications system 100.

A user equipment 121 is located within the cell 115. The user equipment 121 is configured to communicate within the telecommunications system 102 via the network node 110 over a radio link 130 when the user equipment 121 is present in the cell 115 served by the network node 110. The user equipment 121 may, for example, be a mobile terminal or a wireless terminal, a mobile phone, a computer such as for example a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Embodiments of a method in a telecommunications system will now be described with reference to the signalling scheme between the network node 110 and the user equipment 121 depicted in FIG. 13. The signalling scheme in FIG. 13 may comprise the following actions, and may be implemented for any of the below mentioned embodiments or in any combination with those.

Actions 1301

The network node 110 configures the eCCH configuration. This may be performed in order for the network node 110 to be configured to map the eCCH to resources in multiple resource block pairs according to certain mapping conditions, such that, the user equipment 121 may assume that the antenna ports of the resources are related.

One example of a mapping condition is that the multiple resource block pairs are adjacent to each other in frequency, as shown below in FIG. 17. Another example of a mapping condition may be that the transmission of the eCCH is of distributed type, as shown below in FIGS. 16, 18 and 19. A third example of a mapping condition may be that the user equipment 121 is informed by explicit signalling, for example, RRC signalling.

Action 1302

According to some embodiments, the network node 110 sends a configuration message to the user equipment 121 for configuring the user equipment 121 with the eCCH configuration. This means that the network node 110 may send a configuration message to one or more user equipments 121 to configure its settings according to the mapping. Alternatively, the user equipment 121 may already be provided with the eCCH configuration, that is, the eCCH configuration is predefined in the user equipment 121.

Action 1303

According to some embodiments, the user equipment 121 receives the configuration message from the network node 110 and configures its settings in accordance with the eCCH configuration. This means that the user equipment 121 may receive a configuration message from a network node 110 to configure its settings according to the mapping of the network node 110. This may be performed in order for the user equipment 121 to be ready to receive and decode eCCH messages according to the eCCH configuration from the network node 110.

Action 1304

According to some embodiments, the user equipment 121 may send an Acknowledgment (ACK) to the network node 110 informing the network node 110 that the user equipment 121 has changed its setting. This means that the user equipment 121 is ready to receive and decode eCCH messages according to the eCCH configuration.

Action 1305

The network node 110 then starts to encode the eCCH and mapping the encoded eCCH to resources, that is, eREGs in resource blocks, configured for the target user equipment, such as, for example, the user equipment 121.

Also, the network node 110 performs UE-specific precoding of eCCH and demodulation RS (DMRS). Here, when the network node 110 is preparing to transmit an eCCH to the user equipment 121 in multiple resource block pairs for which the user equipment 121 may assume that the antenna ports are related as described in Action 1301, the network node 110 may use the same precoding vector for the UE-specific precoding that is associated with the antenna ports of these resource block pairs.

Action 1306

According to some embodiments, the network node 110 sends the mappings, that is, the eCCH, in control messages or as control messages to the user equipment 121. The network node 110 may also send the mappings in a configuration message or in a Radio Resource Control (RRC) message, or in any similar message or combination of the mentioned.

Action 1307

The user equipment 121 receives and decodes the control messages, that is, eCCH messages. This may be performed according to the eCCH configuration for which the user equipment 121 previously has been configured. In other words, the user equipment 121 may receive the eCCH in a control message sent from the network node 110, or in a configuration message or in a Radio Resource Control (RRC) message, or in any similar message or combination of the mentioned.

Thus, a user equipment 121 receives an eCCH that is distributed over multiple resource block pairs. In each resource block pair, one antenna port is associated with each resource the eCCH is using. According to the eCCH configuration, the user equipment 121 may now, under certain mapping conditions, assume that the antenna ports of the resources in multiple resource block pairs over which the eCCH is distributed are related. This may advantageously improve the channel estimation in the user equipment 121.

Figure 13:
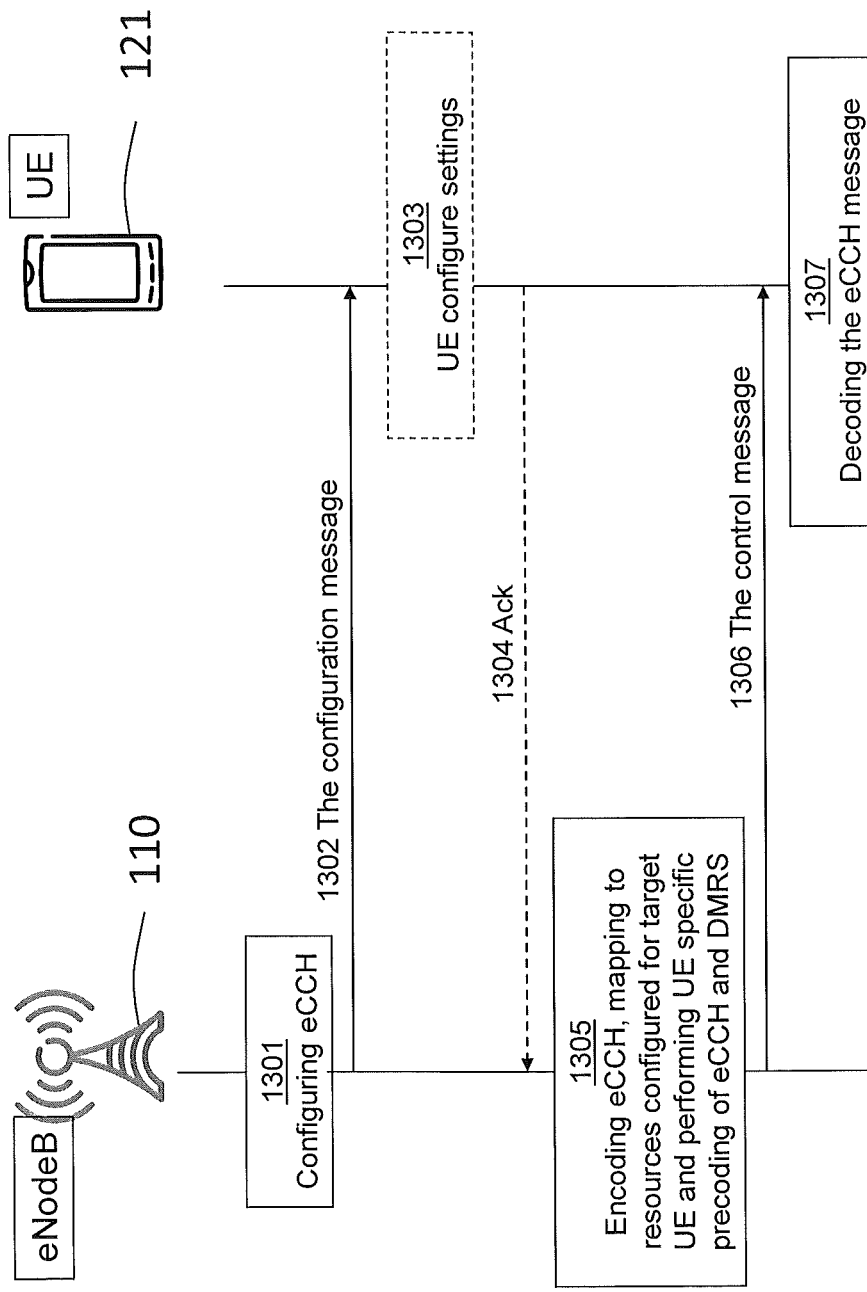
FIG. 13 is a signalling scheme depicting embodiments of a method in the telecommunications system.

A more detailed procedure as seen from the side of the network node 110 in the embodiment of the method shown in FIG. 13 is provided below, that is, a more detailed example of Action 1305.

Figure 14:
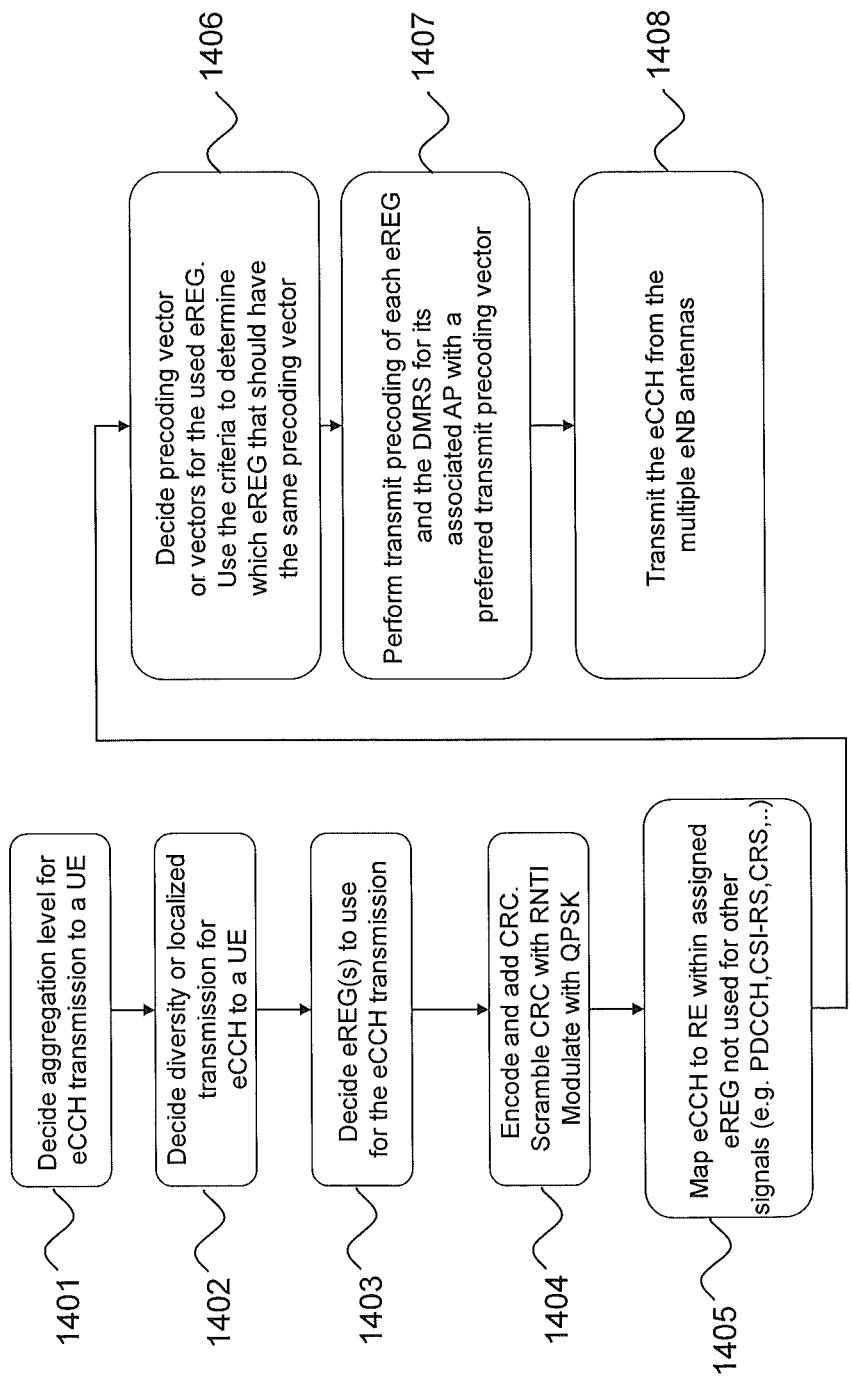
FIG. 14 is a flowchart depicting embodiments of a method in a network node.

Embodiments of a method in the network node 110 will now be described with reference to the flowchart depicted in FIG. 14. FIG. 14 is an illustrating example of a detailed flow chart for a procedure in the network node 110 to transmit an eCCH, for example, a ePDCCH, to the user equipment 121.

The flowchart in FIG. 14 describes the method in the network node 110 for transmitting the eCCH to the user equipment 121 in a telecommunications system 100. The eCCH is distributed over multiple resource block pairs, wherein each of the multiple resource block pairs comprises a number of resources. Each resource is associated with a respective antenna port. Furthermore, the flowchart in FIG. 14 comprises the following actions, and may be implemented for any of the above and below mentioned embodiments or in any combination with those. The actions may be performed in any suitable order.

Action 1401

The network node 110 may decide an aggregation level for eCCH transmission to a user equipment 121.

Action 1402

In some embodiments, the network node 110 decides to use diversity or localized transmission for the eCCH transmission to the user equipment 121.

Action 1403

In this action, the network node 110 may decide which eREG(s) to use for the eCCH transmission. Conventionally, this decision may be constrained by the user equipment search space.

Action 1404

The network node 110 may encode and add CRC to the eCCH transmission. Also, the network node 110 may scramble CRC with RNTI. Further, the network node 110 may modulate the eCCH transmission with, for example, a QPSK-modulation.

Action 1405

The network node 110 may map the eCCH to RE within assigned eREGs not used for other signals, such as, for example, PDCCH, CSI-RS, CRS. This means that the network node 110 may map the modulated eCCH to at least one enhanced resource element group of resource elements in at least one resource block. In this embodiment, the network node 110 maps the eCCH to the multiple resource block pairs, such that more than one resource present in different resource block pairs of the multiple resource block pairs over which the eCCH is distributed, is associated with the same antenna port.

Action 1406

In this action and in some embodiments, the network node 110 may decide precoding vector(s) for the used eREG. This means that the network node 110 may decide to use the same precoding vector(s) for a UE-specific precoding of the resources associated with the antenna ports in the multiple resource blocks. In order to do so, the network node 110 may use the mapping conditions (criteria) to determine which eREG that should have the same precoding vector.

This may be performed by the network node 110 in order to allow beam-forming of an eCCH towards the user equipment 121. Hence, both control information and DMRS may benefit from the precoding gain. Furthermore, when a resource block is unused, there is no DMRS transmitted. This may reduce interference and enable energy savings.

In this case, the user equipment 121 may also be configured to assume that the same precoding vector(s) has been used for the user equipment specific precoding of the resources associated with the antenna ports in the multiple resource blocks.

Action 1407

In some embodiments, the network node 110 performs transmit precoding of each eREG and the DMRS for its associated AP with a preferred transmit precoding vector.

Action 1408

In this action, the network node 110 transmits the mapped eCCH to the user equipment 121. This may be performed by the network node 110 by transmitting the eCCH from multiple network node antennas.

A more detailed procedure as seen from the side of the user equipment 121 in the embodiment of the method shown in FIG. 13 is provided below, that is, a more detailed example of Action 1307.

Figure 15:
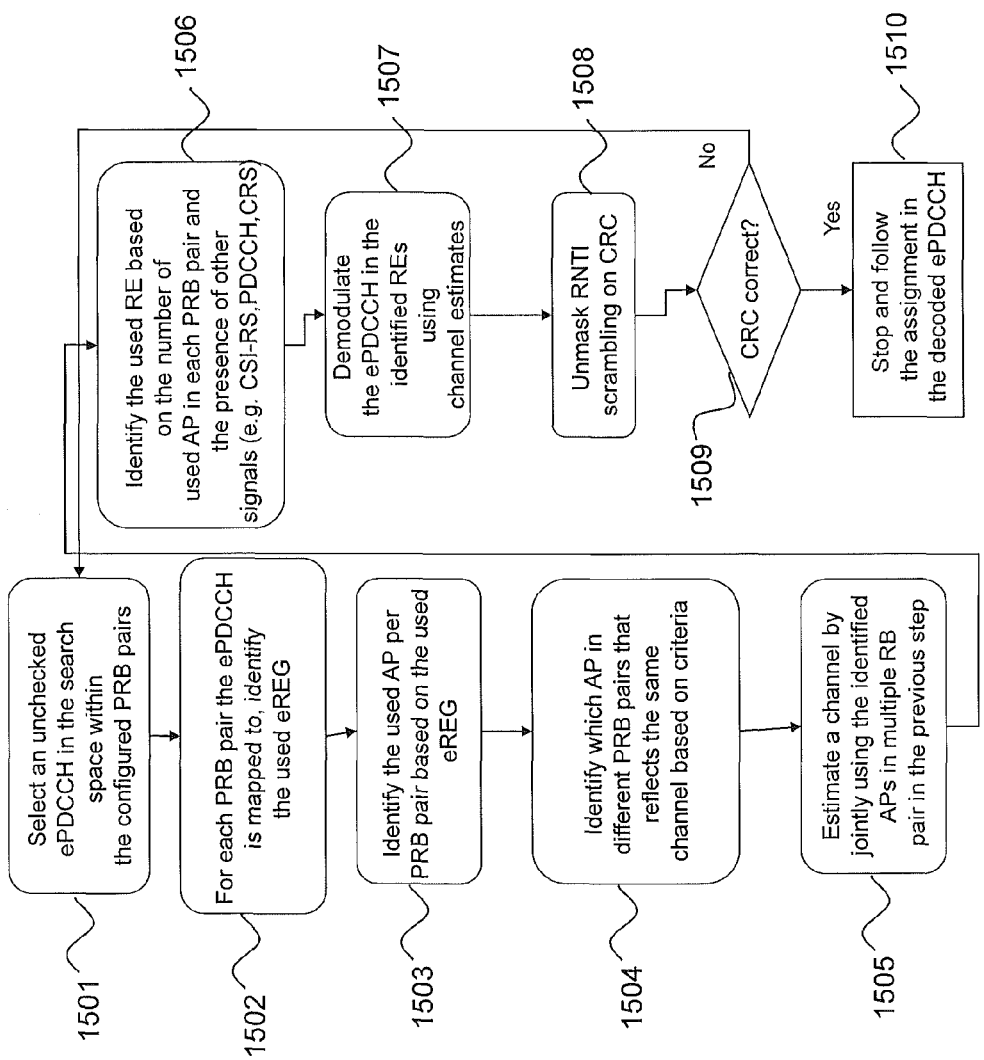
FIG. 15 is a flowchart depicting embodiments of a method in a user equipment.

Embodiments of a method in the user equipment 121 will now be described with reference to the flowchart depicted in FIG. 15. FIG. 15 is an illustrating example of a detailed flow chart for a procedure in the user equipment 121 to receive an eCCH, for example, a ePDCCH, from the network node 110.

The flowchart in FIG. 15 describes the method in the user equipment 121 for estimating the downlink channel upon receiving the eCCH from a network node 110 in a telecommunications system 100. The eCCH is distributed over multiple resource block pairs, wherein each of the multiple resource block pairs comprises a number of resources. Each resource is associated with a respective antenna port. Furthermore, the flowchart in FIG. 15 comprises the following actions, and may be implemented for any of the above and below mentioned embodiments or in any combination with those. The actions may be performed in any suitable order.

Action 1501

The user equipment 121 may select an unchecked eCCH, for example, a ePDCCH, in the search space within the configured resource block pairs. Prior to this, the user equipment 121 will have received an eCCH transmission, that is, received an eCCH message, from the network node 110 as shown in Action 1306 above, Action 1502

In some embodiments, the user equipment 121 may, for each resource block pair the eCCH is mapped to, identify the used eREG.

Action 1503

In this action, the user equipment 121 may identify the used AP per resource block pair based on the used eREG.

Action 1504

The user equipment 121 may identify which AP in different resource block pairs that reflects the same channel based on mapping conditions, i.e. criteria. This means that the user equipment 121 identifies an antenna port being associated with more than one resource. The more than one resource is present in different resource block pairs of the multiple resource block pairs over which the eCCH is distributed. The identification is based on how the eCCH is mapped to the multiple resource block pairs.

Action 1505

The user equipment 121 may estimate a channel by jointly using the identified APs in multiple resource block pair in Action 1504. This means that the user equipment 121 estimate the downlink channel for the eCCH based on the identified antenna port in the more than one resource in the multiple resource block pairs. This may be performed by using a reference symbol associated with the identified antenna port in a first resource block pair, and at least one other reference symbol associated with the identified antenna port in at least one second resource block pair. In other words, this means that the user equipment 121 may assume that a channel estimated using a given reference symbol in the first resource block pair is the same channel estimated using a given reference symbol in a second resource block pair, albeit apart from natural frequency variations of the channel. Accordingly, during demodulation of the received eCCH, the user equipment 121 may estimate the downlink channel for the eCCH in the first and second used resource block pair based on the reference symbols in both of the first and second resource block pairs, that is, determine a joint downlink channel estimate for the eCCH by measuring the effect of the radio channel on both of these reference symbols.

Action 1506

Here, the user equipment 121 may identify the used RE based on the number of used AP in each resource block pair and the presence of other signals, such as, for example, CSI-RS, PDCCH, CRS.

Action 1507

In this action, the user equipment 121 may demodulate the eCCH, e.g. ePDCCH, in the identified REs using channel estimates.

Action 1508

In this action, the user equipment 121 may unmask RNTI and scramble on CRC.

Action 1509

In this action, the user equipment 121 may further check if the CRC is correct.

Action 1511

In this action, the user equipment 121 stops and follows the assignment in the decoded eCCH.

In some of the embodiments, it is assumed that 8 eREGs are created for each RB pair and that each eREG comprises up to 18 RE. The number of RE may depend on the presence of PDCCH, CRS, and CSI-RS. It is also assumed in some embodiments that one CCE may comprise up to 36 RE, which is the same as for LTE Rel. 8. It is also assumed that 1 CCE=2 eREGs. Further, it is also assumed that one ePDCCH or eCCH comprises at least one CCE which may either be localized or distributed over frequency. It is also assumed here that the use of antenna ports is different from previous use where an AP is associated with a MIMO layer, where herein the AP is associated with a region of REs. The regions are orthogonal in the time-frequency grid, hence only one layer is transmitted even though there are multiple AP in a RB pair. The number of APs may be fewer, same or larger than the number of physical antennas.

Figure 16:
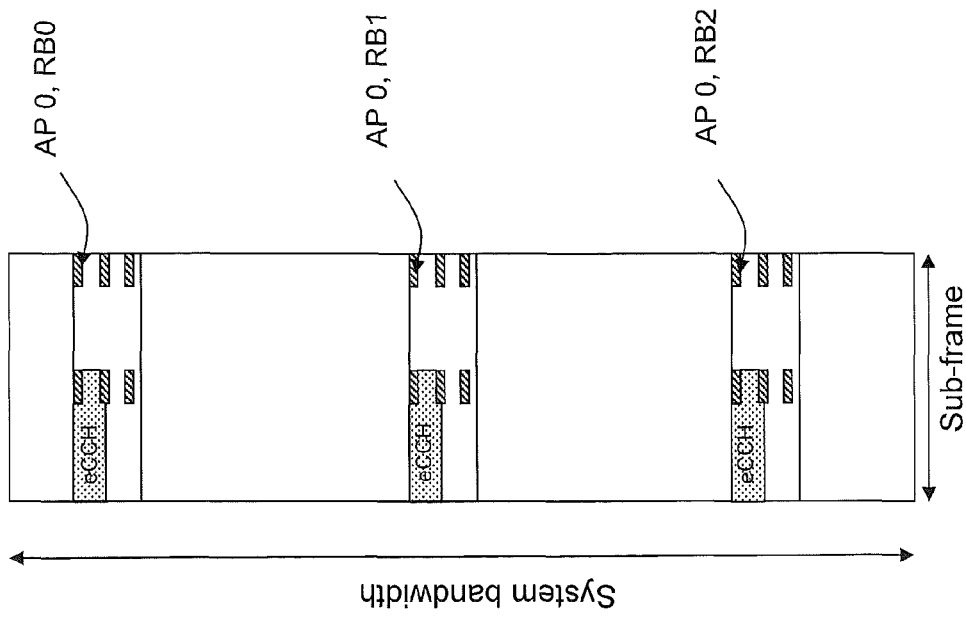
FIG. 16 is a schematic overview depicting an eCCH that is distributed over and uses eREGs in three RB pairs according to some embodiments of the methods, the network node and the user equipment.

FIG. 16 is a schematic overview depicting an eCCH that is distributed over and uses eREGs in three resource block pairs according to some embodiments of the methods, the network node 110 and the user equipment 121 herein.

In this embodiment, an eCCH may be distributed and transmitted over M>1 resource block pairs, wherein M is an integer value. Also, the eCCH may use an eREG belonging to one AP in each resource block pair. In FIG. 16, an example is shown where the eCCH is mapped to M=3 resource block pairs. These three resource block pairs are separated in frequency to achieve frequency diversity. The eREG use AP0 for the used eREGs in each resource block pair, that is, RB0, RB1 and RB2. As described in above embodiments, the user equipment 121 may assume that the AP in the different resource block pairs reflects the same downlink channel. Hence, the user equipment 121 may utilize this when tuning the channel estimation filter that is used for estimating the downlink channel for the eCCH and/or when performing the channel estimation for the eCCH.

Thus, the user equipment 121 may assume that the antenna port of the more than one resource in the different resource block pairs of the multiple resource block pairs reflect the same downlink channel for the eCCH. This may be performed when the eCCH is received in multiple resource block pairs that are distributed and separated in frequency, and in which the resources used by the eCCH in each resource block pair is associated with the same antenna port. In order to enable this feature in the user equipment 121, the network node 110 may be configured to map the eCCH to different resource block pairs of the multiple resource block pairs, which multiple resource block pairs are distributed and separated in frequency. Also, the more than one resource used by the eCCH in each resource block pair is associated with the same antenna port.

Figure 17:
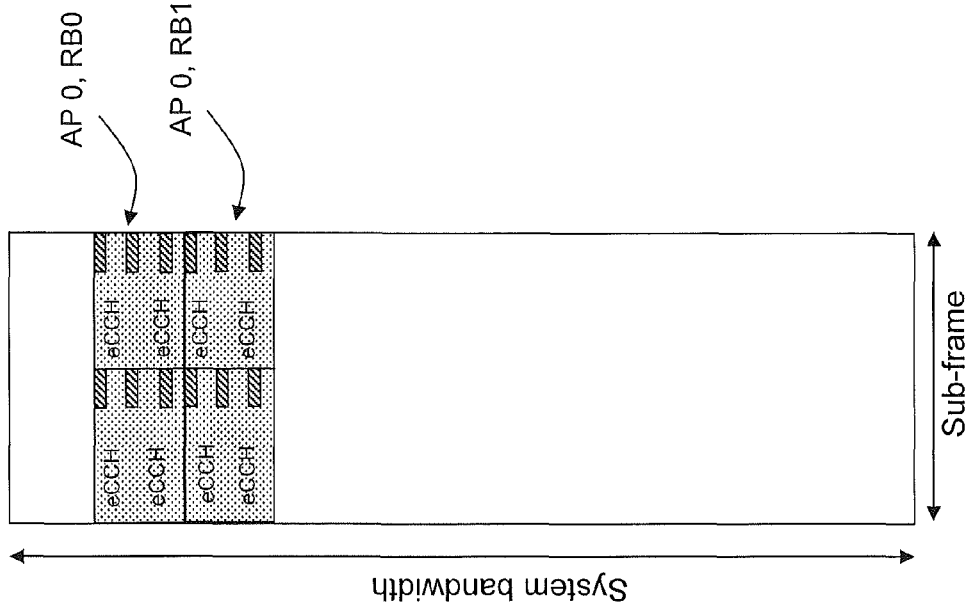
FIG. 17 is a schematic overview depicting an eCCH that is localized over and uses eREGs in two RB pairs according to some embodiments of the methods, the network node and the user equipment.

FIG. 17 is a schematic overview depicting an eCCH that is localized over and uses eREGs in two resource block pairs according to some embodiments of the methods described above, the network node 110 and the user equipment 121 herein.

In this embodiment, an eCCH is localized and may be transmitted over M>1 adjacent resource block pairs, wherein M is an integer value. Also, the eCCH may use eREGs belonging to one AP in each resource block pair. In FIG. 17, an example is shown where the eCCH is mapped to M=2 resource block pairs adjacent in frequency and the eREGs use AP0 in each resource block pair. As described in above embodiments, the user equipment 121 may thus assume that the AP in the different resource block pairs reflects the same downlink channel. Hence, the user equipment 121 may utilize this when tuning the channel estimation filter that is used for estimating the downlink channel for the eCCH and/or when performing the channel estimation for the eCCH.

For instance, the user equipment 121 may perform channel interpolation between the reference symbols in different resource block pairs. It should be noted that two resource block pairs may be needed to perform localized transmission with CCE aggregation level 8, that is, 36*8=288 RE may be needed.

Thus, the user equipment 121 may assume that the antenna port of the more than one resource in the different resource block pairs of the multiple resource block pairs reflect the same downlink channel for the eCCH, when the eCCH is received in multiple resource block pairs that are adjacent to each other in frequency and the resources in the multiple resource block pairs are associated with the same antenna port. In order to enable this feature in the user equipment 121, the network node 110 may be configured to map the eCCH to different resource block pairs of the multiple resource block pairs, which are adjacent to each other in frequency and in which the more than one resource in the resource block pairs is associated with the same antenna port.

Figure 18:
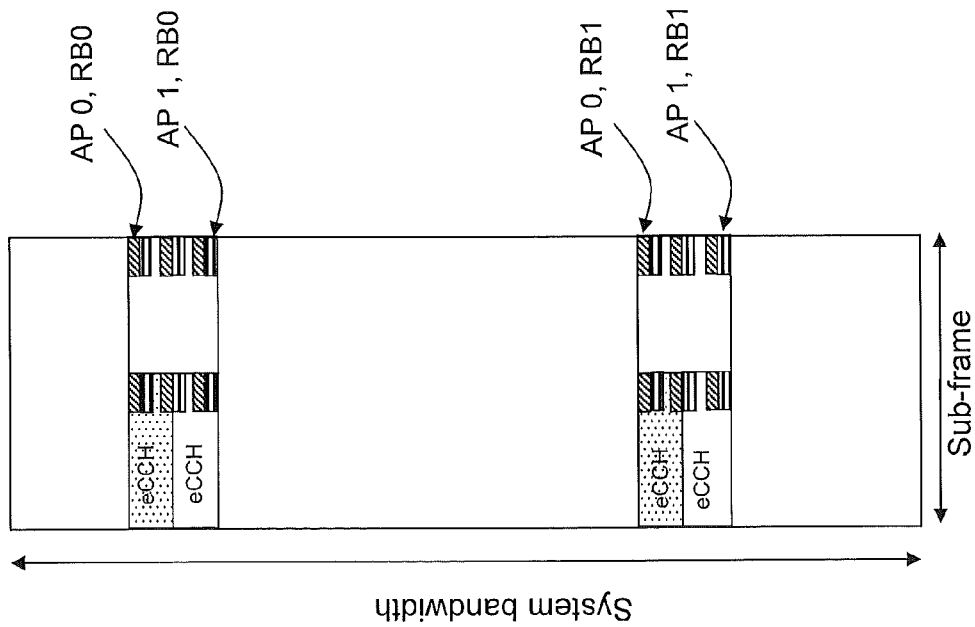
FIG. 18 is a schematic overview depicting an eCCH that is distributed over and uses eREGs in two RB pairs according to some embodiments of the methods, the network node and the user equipment.

FIG. 18 is a schematic overview depicting an eCCH that is distributed over and uses eREGs in two resource block pairs according to some embodiments of the methods, the network node 110 and the user equipment 121 herein.

In this embodiment, an eCCH may be distributed and transmitted over M>1 resource block pairs, wherein M is an integer value. Also, the eCCH may use eREG belonging to a multiple K of APs in each resource block pair. K is here an integer value. For example, K may generally be 1-4, but may also be up to 8 or even more. In FIG. 16, an example is shown where the eCCH is mapped to M=3 resource block pairs. These resource block pairs are separated in frequency to achieve frequency diversity. The eREG use K=2 antenna ports, that is, AP0 and AP1, for the used eREG in each resource block pair, that is, RB1 and RB0. Hence, an AP in a resource block pair may reflect the same downlink channel as a given AP in another resource block pair that is used to transmit the eCCH. As described in above embodiments, the user equipment 121 may assume that the AP #n in the different resource block pairs reflects the same downlink channel for n=0, . . . , K−1. Hence, the user equipment 121 may utilize this when tuning the channel estimation filter that is used for estimating the downlink channel for the eCCH and/or when performing the K=2 channel estimation for the eCCH.

Thus, the user equipment 121 may identify more than one antenna port being associated with more than one resource. Then, separately for each of the more than one antenna ports, the user equipment 121 may estimate a respective downlink channel for the eCCH based on each of the more than one antenna ports of the more than one resource in the multiple resource block pairs. In order to enable this feature in the user equipment 121, the network node 110 may be configured to map the eCCH to the multiple resource block pairs such that more than one resource present in different resource block pairs of the multiple resource block pairs over which the eCCH is distributed, is associated with the same one or more antenna ports.

Figure 19:
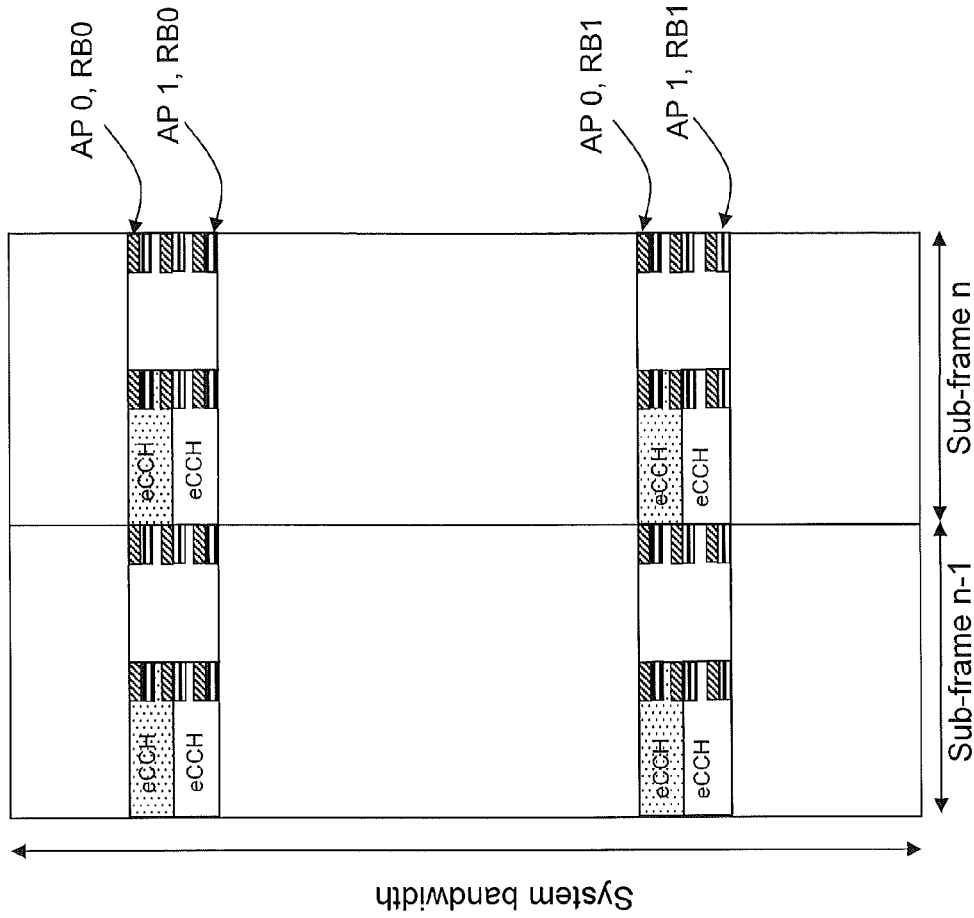
FIG. 19 is a schematic overview depicting an eCCH that is distributed over and uses eREGs in two RB pairs in multiple sub-frames according to some embodiments of the methods, the network node and the user equipment.

FIG. 19 is a schematic overview depicting an eCCH that is distributed over and uses eREGs in two resource block pairs in multiple sub-frames according to some embodiments of the methods, the network node 110 and the user equipment 121 herein.

In this embodiment, the concept according to the previous embodiments of having different resource block pairs with APs reflecting the same downlink channel is extended to multiple radio sub-frames. Thus, the user equipment 121 may combine channel estimates from different time instances in order to improve channel estimation performance. This may be particularly suitable and advantageous when having multiple eCCHs sharing the same APs that are using distributed resource block pairs.

Thus, the user equipment 121 may combine estimated downlink channels for the eCCH from different time instances when estimating the downlink channel for the eCCH, when the eCCH is received in resource block pairs that are mapped into multiple radio sub-frames. In order to enable this feature in the user equipment 121, the network node 110 may be configured to map the eCCH to resource block pairs in multiple radio sub-frames.

Any of the embodiments above may be combined with a control signalling to the user equipment 121 from the network node 110. This may indicate to the user equipment 121 if the user equipment 121 may utilize the channel estimates from multiple resource block pairs or not. Hence, this gives further flexibility to the network node 110 to either use different precoding vectors in the resource block pairs, in which case the user equipment 121 shall not combine the channel estimates, or use the same precoding vector in the resource block pairs, in which case the user equipment 121 may combine the channel estimates. Having different precoding vectors in the different resource block pairs implies that per sub-band precoding is utilized by the network node 110. The control signalling may be UE-specific or cell-specific.

In some embodiments, the condition of whether the user equipment 121 may combine channel estimates from multiple resource block pairs in order to enhance channel estimation performance is implicit and may depend on the relative position of the resource block pairs. For example, if a user equipment 121 receives an eCCH in adjacent resource block pairs, the user equipment 121 may assume that one antenna port in the first resource block pair is the same antenna port as in the second resource block pair. In this case, if the user equipment 121 receives an eCCH over multiple resource block pairs that are not adjacent to each other, then the user equipment 121 may not assume that the used antenna ports are the same.

The condition of whether the user equipment 121 may combine channel estimates from multiple resource block pairs in order to enhance channel estimation performance is implicit and may depend on whether the demodulated eCCH is of localized or distributed type.

In some embodiments, the condition of whether the user equipment 121 combines channel estimates from multiple resource block pairs in order to enhance channel estimation performance is implicit and may depend on attributes of the eCCH. These attributes may be, for example, the used CCE index, the used aggregation level, whether the eCCH belongs to the common or UE-specific search space, or on the used radio network temporary identity (RNTI).

In some embodiments, the condition of whether the user equipment 121 may combine channel estimates from multiple resource block pairs in order to enhance channel estimation performance depend on whether the carrier has CRS transmission or not.

In some embodiments, the DMRS needs to undergo the same precoding operation as the eCCH. This is so that the used precoding vector becomes transparent to the receiving user equipment 121. This may be performed in order to enable spatial reuse and frequency domain Inter-Cell Interference Coordination (ICIC) of a control channel resource, as well as, beam-forming, for the eCCH; this to ensure cell splitting and beam-forming gains.

The eCCH and the associated DMRS may be self-contained within the same resource block pair, and precoded with the same precoding vector in order for the use of the precoding vector to become transparent to the user equipment 121. This allows beam-forming of an eCCH towards the user equipment 121 and both control data and DMRS to benefit from the precoding gain. Furthermore, when a resource block is unused, there is no DMRS transmitted there to reduce interference and enable energy savings.

However, if an eCCH is transmitted without downlink channel knowledge to the user equipment 121 or if the control message is intended for multiple user equipments, then UE-specific beam-forming cannot be used. In this case, diversity transmissions which have robust coverage over the whole cell may be suitable. The diversity transmission may be used, for example, for the common control channel transmission or the transmission of ePHICH. In order to reduce DMRS overhead, the DMRS used for this type of transmission may be re-used by multiple user equipments, since it anyway isn't precoded towards any particular user equipment. Hence, this can be seen as a "localized common reference signal" for this type of diversity transmission, present only in the resource block pairs where this diversity transmission of eCCHs takes place.

In diversity transmission of an eCCH, a solution may be a case where multiple user equipments use the same DMRS for the transmission of the enhanced control messages. These DMRS may only be transmitted in those resource block pairs where there is an eCCH of this type transmitted.

Although the DMRS are proposed to be self-contained within the resource block pairs used for a particular eCCH transmission, it is worth considering resource block bundling for improving the channel estimation performance. This may be similar to what is used for transmission mode 9. This may be evaluated in cases where CRS are not transmitted. This may be the case in pico cells and/or for a new carrier type.

According to one embodiment, resource block bundling may be used to improve channel estimation performance for the eCCH.

For small ePDCCH transmission, multiple ePDCCH will fit into one resource block pair. Since these ePDCCH may target different user equipments, and thus use individual precoding vectors, each ePDCCH needs one unique DMRS or antenna port. This means that the maximum number of antenna ports that needs to be supported per resource block pair is given by the maximum number of ePDCCH that may be transmitted in one resource block pair. Since a resource block pair comprises at most 144 RE that are available for ePDCCH transmission, wherein 24 RE is taken away for DMRS, there will be an availability for four ePDCCH with one CCE (=36 RE) each. Hence, a resource block pair may need to support up to four independently pre-coded ePDCCH transmissions. Thus, also up to four orthogonal DMRS may need to be supported within each resource block pair.

Furthermore, the Rel.10 UE-specific DMRS for the shared data channel may support up to eight orthogonal DMRS. According to some embodiments, the DMRS associated with layer 1-4 transmission from the shared data channel, that is, antenna ports 7, 8, 9 and 10, may be used for the eCCH transmission. Thus, the same channel estimator may be reused for the shared data and eCCH transmissions.

It should be noted that the use of the DMRS is somewhat different compared to the shared data channel, where each orthogonal DMRS usually is associated with a MIMO layer of a PDSCH transmission. Here, a DMRS is associated with one of the ePDCCH transmissions within the resource block pair, and the ePDCCH transmissions are orthogonal in the time-frequency grid, and do not comprise overlapping layers as in the MIMO case.

One should note that from the system perspective, the DMRS are not thus UE-specific in this case, but rather "group-UE-specific". However, as long as the user equipment 121 knows which DMRS to use when demodulating a certain control message, there is no risk of confusion.

In some embodiments, the Rel.10 UE-specific DMRS for the shared data channel may be the baseline for eCCH DMRS. Hence, up to four orthogonal DMRS is supported within each resource block pair.

It has been agreed for a shared cell scenario, such as, the CoMP scenario 4, that for the shared data channel, the DMRS sequence generator may be semi-statically configured in a UE-specific manner. This allows for cell splitting of the PDSCH transmission in the shared cell scenario. Hence, when using RRH and with isolation between the RRH coverage areas, a DMRS for PDSCH demodulation can be re-used and thereby comprise a MU-MIMO operation with non-orthogonal DMRS. The same functionality may also be used for the eCCH in order to enable the same cell splitting gains and MU-MIMO operation with non-orthogonal RS. Therefore, in order to align with the shared data channel DMRS, the initialization values for the DMRS scrambling generator used for the eCCH transmission should be semi-statically configured in a UE-specific manner.

It should also be noted that when referring to an eCCH in any of the above embodiments, this may be any control channel that is frequency multiplexed with data and has self-contained reference signals for demodulation within the block of resources occupied by the control information.

In some embodiments, the possibility to use of only one resource block instead of a resource block pair for the control transmission is given. It may also be so that a eREG used for a certain eCCH transmission may be mapped only to one of the two resource blocks in a resource block pair.

Although the described embodiments above may be implemented in any appropriate type of telecommunication system supporting any suitable communication standards and using any suitable components, particular embodiments of the described solutions may be implemented in an LTE network, the example network may include one or more instances of wireless devices 121, e.g. mobile terminals, laptops, M2M-capable devices, or home base station, and one or more network nodes capable of communicating with these wireless devices, where examples of network nodes include eNBs 110, home base stations 110, positioning node (eSMLC), MME, SON node, and Gateway. Thus, some network nodes such as home base stations 110, 121 may in some scenarios be considered as wireless devices within the context of this disclosure. This is in particular true for small network devices where the form factor may significantly affect radio performance.

The example network may further include any additional elements suitable to support communication between wireless devices or between a wireless device and another communication device, such as, a landline telephone. Although the illustrated wireless devices may represent communication devices that include any suitable combination of hardware and/or software, these wireless devices may, in particular embodiments, represent devices such as the example wireless device 121 illustrated in greater detail by FIG. 21. Similarly, although the illustrated network nodes may represent network nodes that include any suitable combination of hardware and/or software, these network nodes may, in particular embodiments, represent devices such as the example network node 110 illustrated in greater detail by FIG. 20.

As shown in FIG. 21, the example wireless device 121 includes processing circuitry 2102, a memory 2103, radio circuitry 2101, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 2102 executing instructions stored on a computer-readable medium, such as the memory 2103 shown in FIG. 21. Alternative embodiments of the wireless device 121 may include additional components beyond those shown in FIG. 21 that may be responsible for providing certain aspects of the wireless device's functionality, including any of the functionality described above and/or any functionality necessary to support the solution described above.

To perform the method actions for transmitting an enhanced control channel, eCCH, the network node 110 comprises the following arrangement depicted in FIG. 20. FIG. 20 shows a schematic block diagram of embodiments of the network node 110.

The network node 110 comprises a processing circuitry 2003 configured to map the eCCH to the multiple resource block pairs such that more than one resource present in different resource block pairs of the multiple resource block pairs over which the eCCH is distributed, is associated with the same antenna port. It is also configured to transmit the mapped eCCH to the user equipment via a radio circuitry 2001. In some embodiments, the processing circuitry 2003 is configured to decide to use the same precoding vector(s) for the user equipment specific precoding of the resources associated with the antenna ports in the multiple resource blocks.

Furthermore, in some embodiments, the eCCH is mapped to different resource block pairs of the multiple resource block pairs which are adjacent to each other in frequency and in which the more than one resource in the resource block pairs is associated with the same antenna port. Alternatively, the eCCH may be mapped to different resource block pairs of the multiple resource block pairs which are distributed and separated in frequency, wherein the more than one resource used by the eCCH in each resource block pair is associated with the same antenna port. In a further embodiment, the eCCH is mapped to resource block pairs in multiple radio sub-frames.

The processing circuitry 2003 may also be configured to map the eCCH to the multiple resource block pairs such that more than one resource present in different resource block pairs of the multiple resource block pairs over which the eCCH is distributed, is associated with the same one or more antenna ports. The processing circuitry 2003 may further be configured to send a configuration message to one or more user equipments 121 to configure its or theirs settings according to the previously performed mapping.

To perform the method actions for estimating a downlink channel, the user equipment 121 comprises the following arrangement depicted in FIG. 21. FIG. 21 shows a schematic block diagram of embodiments of the user equipment 121.

The user equipment 121 comprises a processing circuitry 2102 configured to identify an antenna port being associated with more than one resource, which more than one resource are present in different resource block pairs of the multiple resource block pairs over which the eCCH is distributed, which identifying is based on how the eCCH is mapped to the multiple resource block pairs. It is also configured to estimate the downlink channel for the eCCH based on the identified antenna port in the more than one resource in the multiple resource block pairs.

In some embodiments, the processing circuitry 2102 is configured to decide a precoding vector(s) by assuming that a same precoding vector(s) has been used for a user equipment specific precoding of the resources associated with the antenna ports in the multiple resource blocks.

Furthermore, in some embodiments, estimating the downlink channel for the eCCH based on the identified antenna port comprises the processing circuitry being further configured to use a reference symbol associated with the identified antenna port in a first resource block pair, and at least one other reference symbol associated with the identified antenna port in at least a second resource block pair.

The processing circuitry 2102 may further be configured to assume that the antenna port of the more than one resource in the different resource block pairs of the multiple resource block pairs reflect the same downlink channel for the eCCH, when the eCCH is received in multiple resource block pairs that are adjacent to each other in frequency and the resources in the multiple resource block pairs are associated with the same antenna port. Alternatively, the processing circuitry 2102 may be configured to assume that the antenna port of the more than one resource in the different resource block pairs of the multiple resource block pairs reflect the same downlink channel for the eCCH, when the eCCH is received in multiple resource block pairs that are distributed and separated in frequency and in which the resources used by the eCCH in each resource block pair is associated with the same antenna port. In a further embodiment, the processing circuitry 2103 may be configured to combine estimated downlink channels for the eCCH from different time instances when estimating the downlink channel for the eCCH, when the eCCH is received in resource block pairs that are mapped into multiple radio sub-frames. In yet a further embodiment, the processing circuitry 2102 may further be configured to identify more than one antenna port being associated with the more than one resource, and to estimate a respective downlink channel for the eCCH, separately for each of the more than one antenna ports, based on each of the more than one antenna ports of the more than one resource in the multiple resource block pairs.

The estimation of the downlink channel for the eCCH may also comprise tuning of a channel estimation filter that is used for estimating the downlink channel for the eCCH.

The processing circuitry 2102 may also be configured to receive a configuration message from a network node 110 to configure its settings according to the mapping of the network node 110.

ABBREVIATIONS

AP Antenna port
CCE Control Channel Element
CDM Code-Division Multiplexing
CRS Common Reference Symbols
DCI Downlink Control Information
DL Downlink
DMRS Demodulation Reference Symbols
eCCH enhanced Control CHannel
eNB enhanced Node B
ePDCCH enhanced Physical Downlink Control CHannel
eREG enhanced Resource Element Group
eSMLC enhanced Serving Mobile Location Center
FDM Frequency-Division Multiplexing
MIMO Multiple-Input Multiple-Output
MME Mobility Management Entity
MU-MIMO Multiple UEs-MIMO
M2M Machine-to-machine
PBCH Physical Broadcast CHannel
PDCCH Physical Downlink Control CHannel
PDSCH Physical Downlink Shared CHannel
PHICH Physical HARQ indicator CHannel
RB or resource block Resource block
RE Resource Element
RN Relay Node
R-PDCCH Relay-Physical Downlink Control CHannel
RRH Remote Radio Head
RS Reference Signal
SINR Signal-to-Noise Ratio
SON Self-Organising Network
SU-MIMO Single UEs-MIMO
TDM Time-Division Multiplexing
UE User Equipment
UL Uplink
QPSK Quadrature Phase Shift Keying When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be construed as limiting the scope.

The invention claimed is:

1. A method in a user equipment device for estimating a downlink channel upon receiving an enhanced control channel (eCCH) from a network node in a telecommunications system, wherein the eCCH is distributed over a plurality of resource block pairs, wherein each of the plurality of resource block pairs comprises a plurality of resources, and wherein each of the plurality of resources is associated with a respective antenna port, the method comprising:
   identifying an antenna port being associated with multiple ones of the plurality of resources, wherein the multiple ones of the plurality of resources associated with the antenna port are present in different ones of the plurality of resource block pairs over which the eCCH is distributed, wherein the identifying is based on how the eCCH is mapped to the plurality of resource block pairs; and
   estimating the downlink channel for the eCCH based on the identified antenna port in the multiple ones of the plurality of resources in the plurality of resource block pairs;
   wherein the multiple ones of the plurality of resources in the different ones of the plurality of resource block pairs reflect a same downlink channel for the eCCH based on a mapping condition, the mapping condition being based on frequency proximity between the plurality of resource block pairs.

2. The method according to claim 1,
   wherein a same precoding vector has been used for a user equipment device specific precoding of the multiple ones of the plurality of resources associated with the antenna ports in the plurality of resource block pairs.

3. The method according to claim 1, wherein estimating the downlink channel for the eCCH based on the identified antenna port comprises using a reference symbol associated with the identified antenna port in a first one of the plurality of resource block pairs, and at least one other reference symbol associated with the identified antenna port in at least a second one of the plurality of resource block pairs.

4. The method according to claim 1, wherein
the multiple ones of the plurality of resources in the different ones of plurality of resource block pairs reflect a same downlink channel for the eCCH when the eCCH is received in the plurality of resource block pairs that are adjacent to each other in frequency and the multiple ones of the plurality of resources in the plurality of resource block pairs are associated with a same antenna port.

5. The method according to claim 1, wherein
the multiple ones of the plurality of resources in the different ones of the plurality of resource block pairs reflect a same downlink channel for the eCCH when the eCCH is received in the plurality of resource block pairs that are distributed and separated in frequency and in which the multiple ones of the plurality of resources used by the eCCH in each of the plurality of resource block pairs is associated with a same antenna port.

6. The method according to claim 1, further comprising:
combining estimated downlink channels for the eCCH from different time instances when estimating the downlink channel for the eCCH, when the eCCH is received in the plurality resource block pairs that are mapped into multiple radio sub-frames.

7. The method according to claim 1, further comprising:
identifying multiple antenna ports being associated with the multiple ones of the plurality of resources; and
estimating a respective downlink channel for the eCCH, separately for each of the multiple antenna ports, based on each of the multiple antenna ports associated with the multiple ones of the plurality of resources in the plurality of resource block pairs.

8. The method according to claim 1, wherein estimating the downlink channel for the eCCH comprises tuning of a channel estimation filter that is used for estimating the downlink channel for the eCCH.

9. The method according to claim 1, further comprising:
receiving a configuration message from the network node to configure the network node's settings according to the mapping of the network node.

10. A user equipment device for estimating a downlink channel upon receiving an enhanced control channel (eCCH) from a network node in a telecommunications system, wherein the eCCH is distributed over a plurality of resource block pairs, wherein each of the plurality of resource block pairs comprises a plurality of resources, and wherein each of the plurality of resources is associated with a respective antenna port, the user equipment device comprising:
processing circuitry configured to identify an antenna port being associated with multiple ones of the plurality of resources, wherein the multiples ones of the plurality of resources associated with the antenna port are present in different ones of the plurality of multiple resource block pairs over which the eCCH is distributed, wherein the identifying is based on how the eCCH is mapped to the plurality of resource block pairs, and to estimate the downlink channel for the eCCH based on the identified antenna port in the multiple ones of the plurality of resources in the plurality of resource block pairs;
wherein the multiple ones of the plurality of resources in the different ones of the plurality of resource block pairs reflect a same downlink channel for the eCCH based on a mapping condition, the mapping condition being based on frequency proximity between the plurality of resource block pairs.

11. The user equipment according to claim 10, wherein the processing circuitry is further configured to decide a precoding vector based on a same precoding vector having been used for a user equipment device specific precoding of the multiples ones of the plurality of resources associated with the antenna ports in the plurality of resource block pairs.

12. The user equipment according to claim 10, wherein estimating the downlink channel for the eCCH based on the identified antenna port comprises the processing circuitry being further configured to use a reference symbol associated with the identified antenna port in a first one of the plurality of resource block pairs, and at least one other reference symbol associated with the identified antenna port in at least a second one of the plurality of resource block pairs.

13. The user equipment according to claim 10, wherein the plurality ones of the plurality of resources in the different ones of the plurality of resource block pairs reflect a same downlink channel for the eCCH when the eCCH is received in the multiple resource block pairs that are adjacent to each other in frequency and the multiple ones of the plurality of resources in the plurality of resource block pairs are associated with a same antenna port.

14. The user equipment according to claim 10, wherein the multiple ones of the plurality of resources in the different ones of the plurality of resource block pairs reflect a same downlink channel for the eCCH when the eCCH is received in the plurality of resource block pairs that are distributed and separated in frequency and in which the multiple ones of the plurality of resources used by the eCCH in each of the plurality of resource block pairs is associated with a same antenna port.

15. The user equipment according to claim 10, wherein the processing circuitry is further configured to combine estimated downlink channels for the eCCH from different time instances when estimating the downlink channel for the eCCH, when the eCCH is received in the plurality of resource block pairs that are mapped into multiple radio sub-frames.

16. The user equipment according to claim 10, wherein the processing circuitry is further configured to identify multiple antenna ports being associated with the multiple ones of the plurality of resources, and to estimate a respective downlink channel for the eCCH, separately for each of the multiple antenna ports, based on each of the multiple antenna ports associated with the multiple ones of the plurality of resources in the plurality of resource block pairs.

17. The user equipment according to claim 10, wherein the estimation of the downlink channel for the eCCH comprises tuning of a channel estimation filter that is used for estimating the downlink channel for the eCCH.

18. The user equipment according to claim 10, wherein the processing circuitry is further configured to receive a configuration message from the network node to configure the network node's settings according to the mapping of the network node.

* * * * *

UNITED STATES PATENT AND TRADEMARK OFFICE
CERTIFICATE OF CORRECTION

| | | |
|---|---|---|
| PATENT NO. | : 9,236,991 B2 | Page 1 of 1 |
| APPLICATION NO. | : 13/502700 | |
| DATED | : January 12, 2016 | |
| INVENTOR(S) | : Frenne et al. | |

It is certified that error appears in the above-identified patent and that said Letters Patent is hereby corrected as shown below:

Specification

Figure 5:
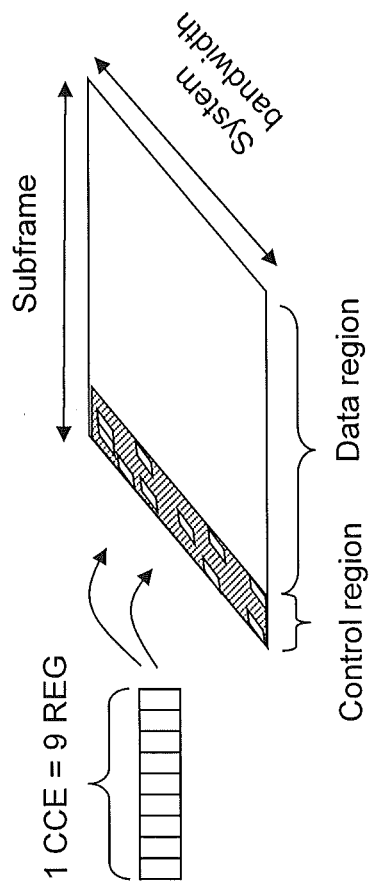
Figure 4:
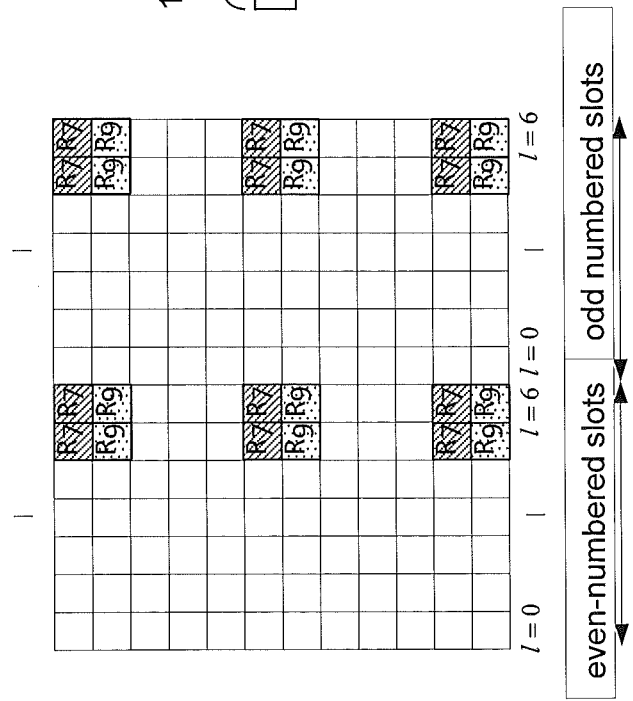
FIG. 4 are schematic examples of UE-specific RS in LTE.
Figure 6:
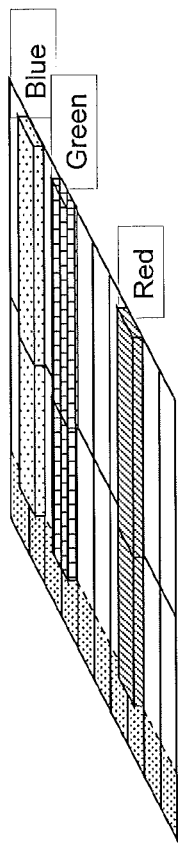
FIG. 6 is a schematic overview depicting a DL sub-frame comprising a relay control channel.
Figure 7:
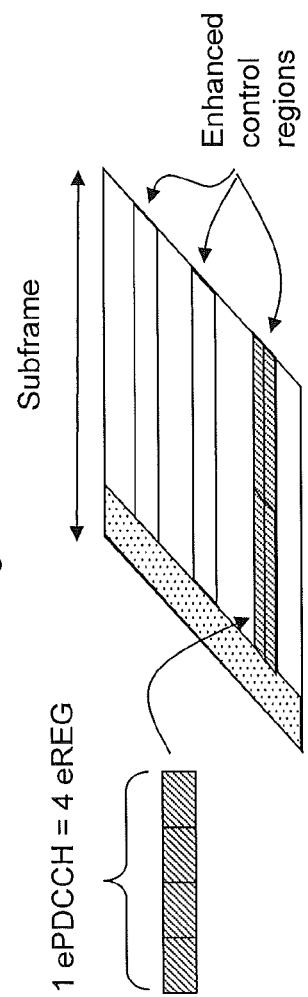
FIG. 7 is a schematic overview depicting a DL sub-frame comprising a CCE belonging to a PDCCH.
Figure 8:
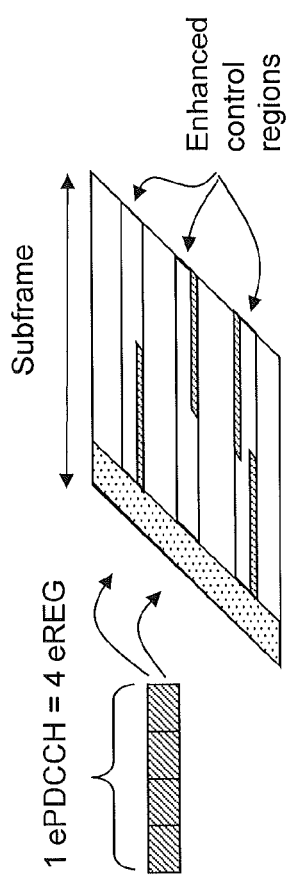
FIG. 8 is a schematic overview depicting a DL sub-frame comprising a CCE belonging to a PDCCH.
Figure 10:
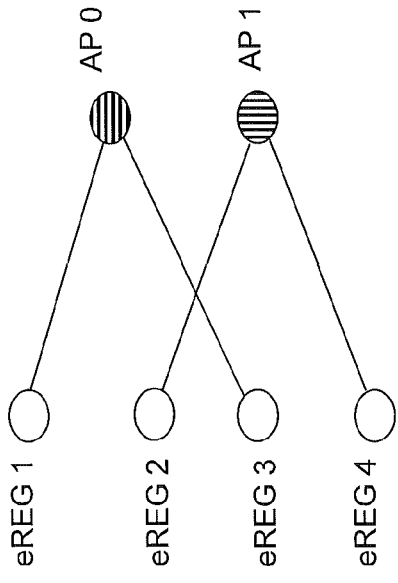
FIG. 10 is a schematic overview depicting a node diagram of associations between AP and eREGs in FIG. 9.
Figure 11:
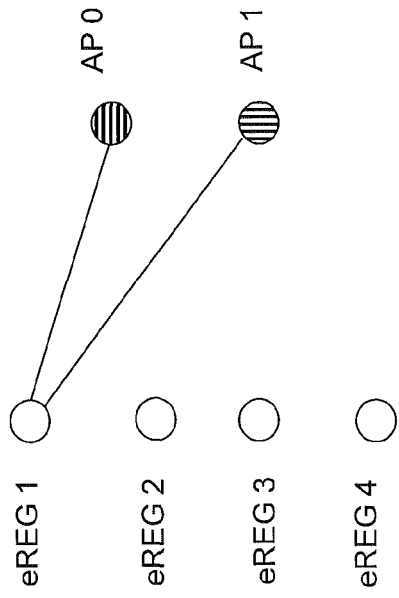
FIG. 11 is a schematic overview depicting another node diagram of associations between AP and eREGs.
Figure 9:
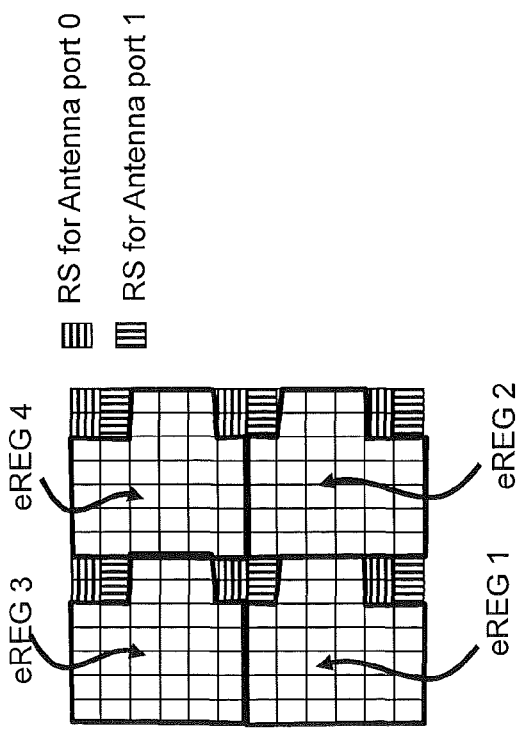
FIG. 9 is a schematic overview depicting a DL RB pair.

In Column 8, after Line 5, insert -- FIG. 5 is a schematic overview depicting control channel elements, --.

In Column 12, Line 11, delete "above," and insert -- above. --, therefor.

In Column 19, Line 31, delete "processing circuitry 2103" and insert -- processing circuitry 2102 --, therefor.

Claims

In Column 21, Line 3, in Claim 4, delete "of" and insert -- of the --, therefor.

In Column 21, Line 22, in Claim 6, delete "plurality" and insert -- plurality of --, therefor.

Signed and Sealed this
Twelfth Day of April, 2016

Michelle K. Lee
*Director of the United States Patent and Trademark Office*